United States Patent [19]

Anderson et al.

[11] Patent Number: 5,745,908
[45] Date of Patent: Apr. 28, 1998

[54] METHOD FOR CONVERTING A WORD PROCESSING FILE CONTAINING MARKUP LANGUAGE TAGS AND CONVENTIONAL COMPUTER CODE

[75] Inventors: Charles Anderson, Newbury; Stewart Barr, Maidenhead; Clive Beavis, Wilts; David Cleland, Reading; Raymond Obin, Newbury, all of United Kingdom

[73] Assignee: Systems Focus International, Aruba, Netherlands

[21] Appl. No.: 625,743

[22] Filed: Mar. 29, 1996

[51] Int. Cl.[6] .................................................. G06F 17/00
[52] U.S. Cl. ............................................................... 707/513
[58] Field of Search ................................ 395/774, 705, 395/752

[56] References Cited

U.S. PATENT DOCUMENTS

| | | | |
|---|---|---|---|
| 5,117,349 | 5/1992 | Tirfing et al. | 395/603 |
| 5,546,583 | 8/1996 | Shriver | 395/680 |
| 5,548,508 | 8/1996 | Nagami | 395/752 |
| 5,587,902 | 12/1996 | Kugimiya | 395/752 |

Primary Examiner—Joseph R. Burwell
Attorney, Agent, or Firm—Calvin B. Ward

[57] ABSTRACT

A method for operating a computer converts a word processing file to a computer program source file, which generates an output stream when run. The word processing file includes a linear sequence of characters having segments marked by beginning and ending tags. The method of the present invention translates the linear sequences of characters in the word processor file that are not surrounded by the tags to output statements in the computer program source file. The output statements cause the computer program generated from the source file, when executed, to reproduce the linear sequences of characters from the word processor file not surrounded by the tags in an output stream generated by the computer program. The method translates the linear sequences of characters in the word processing file that are surrounded by predetermined tags into computer source code statements. In so doing, the translation takes the form of merely copying the linear sequences of characters of the word processing file to the computer program source file or of translating the linear sequences of characters of the word processing file into statements recognized in the computer language.

6 Claims, 1 Drawing Sheet

METHOD FOR CONVERTING A WORD PROCESSING FILE CONTAINING MARKUP LANGUAGE TAGS AND CONVENTIONAL COMPUTER CODE

FIELD OF THE INVENTION

The present invention relates to compilers for use in computing systems, and more particularly, to a preprocessor for generating a source file for a predetermined computer language compiler or interpreter in which the resulting computer program generates a word processing file that has part of its content generated by the computer program.

BACKGROUND OF THE INVENTION

The World Wide Web ("Web") has become a very successful means of communication between central sites connected to the Internet and individual users on the Internet who wish to communicate with the site. The communications are controlled by two programs, a Web Browser that runs on the user's computer and a Web server that runs on the site's computer. A Web Browser sends a request to a Web Server using the HTTP protocol. A request results in a MIME ("Multipurpose Internet Mail Extensions"—see IETF RFC1341, 1342, 1521) Stream being sent back to the Web Browser. The MIME stream includes a Content Type header for the data that indicates how the Web Browser will treat the data being sent. For example, a "text/html" MIME type indicates that the data is in the hypertext markup language (HTML), and should be interpreted accordingly; an "image/gif" MIME type indicates that the data is a "gif" image file, and should be rendered as an image after unpacking the data in the file.

The Web Server typically services a request either by sending back a file stored locally on the server or by running a program, the output of which is the MIME stream to be sent back to the browser. As noted above, the Web typically makes use of the hypertext format to display information to a user and receive input from the user. Hypertext allows a body of information to be organized into a hierarchical system in which the user can pursue increasing levels of specificity by following the various hypertext links from one document to the next. A typical hypertext text display system (a Web Browser) displays a document in which selected words or phrases are highlighted. The highlighted phrase indicates that another document related to that phrase is in the system. If the person viewing the document selects one of these words or phrases by pointing and clicking using a pointing device, the second document related to that word or phrase is sent to the user's screen. The user may return to the original document at any time selecting a "back" option on the viewer screen.

This form of information display has found wide acceptance on the Internet because of its ease of use. A user located at a terminal on the network connects to a server on the network that has a "home page" in hypertext format. The home page is then displayed on the user's screen by the browser. When the user selects a highlighted word, the browser communicates the user's choice to the server in a MIME data stream. The server then transfers the corresponding file to the user's machine via the network. The browser on the user's machine then displays this file to the user.

Conventional browser's also allow the user to input text on the user's screen which is then transferred to the server when the user selects a graphical element such as a "button". Hence, the user can communicate information to the server beyond the predefined hypertext link information, provided the server is programmed to use this information.

The hypertext mode of information organization is also efficient from the point of view of the home page provider on the server. A home page is written in HTML. HTML is a word processing format which allows the user to define a page as the user would with a conventional word processor. In fact, programs for converting the various conventional word processing formats to HTML are commercially available. For each phrase that is to provide a link, the user marks the phrase by enclosing it with beginning and ending "tags". The user then defines another hypertext file that contains the document to be displayed in response to the user selecting the phrase. Hence, a server program can be as simple as a set of HTML documents created with a conventional word processing system and stored on the server.

If the interaction between the user and server is basically a transfer of predefined information which is static in nature, the simple "set of documents" mode is satisfactory. If, however, the information to be transferred requires some form of processing prior to the transfer, the simple hypertext engines are less than ideal. Consider an application in which the server must execute a program to gather and calculate the data that forms a portion of hypertext material that is to be returned to the user. To provide such a service, the server must include a program that is specific to the application and which performs the computations and then generates the results in the form of a hypertext document that is delivered on the network. The HTTP Protocol defines a general mechanism for programs to operate in this way, called the Common Gateway Interface (or CGI). A program that uses this mechanism is often referred to as a CGI Program.

There is no standardized program support for generating hypertext documents within a conventional processing program written in one of the common programming languages such as COBOL or C. The output facilities of these languages typically provide various forms of output statements that allow the program to output a block of text. Hence, to generate the hypertext document, the programmer must, in effect, include statements to writeout the hypertext portion of the document one line at a time. In addition, the user must be familiar with all of the various "tags" used in HTML so that the user can provide these tags in the output stream of the program.

Similarly, the hypertext generating programs provide, at most, a limited scripting capability to support computations on the server. For example, some engines have the ability to make calls to database engines to retrieve data to be inserted into the hypertext document.

Broadly, it is the object of the present invention to provide a system that combines the strength of both a word processor and a conventional computer language.

It is a further object of the present invention to provide a compiler that allows hypertext documents and native computer code to be combined in a manner in which the benefits of compiled general purpose computer language can be achieved in a hypertext document.

These and other objects of the present invention will become apparent to those skilled in the art from the following detailed description of the invention and the accompanying drawings.

SUMMARY OF THE INVENTION

The present invention is a method for operating a computer to convert a word processing file to a computer program that will generate a word processing file when run. The word processing file includes a linear sequence of characters having segments marked by beginning and ending tags. The word processing file is converted to a source file for a computer language. The method of the present invention translates the linear sequences of characters in the word processor file that are not surrounded by the tags to output statements in the computer code source file. The output statements cause a computer program generated from the source file to reproduce the material in an output stream generated by the computer program. The method translates the linear sequences of the word processing file that are surrounded by predetermined tags into computer source code statements. The translation may take the form of merely copying the material to the source file or of translating the statements into statements recognized in the computer language.

DETAILED DESCRIPTION OF THE PREFERRED EMBODIMENTS OF THE INVENTION

Figure 1:
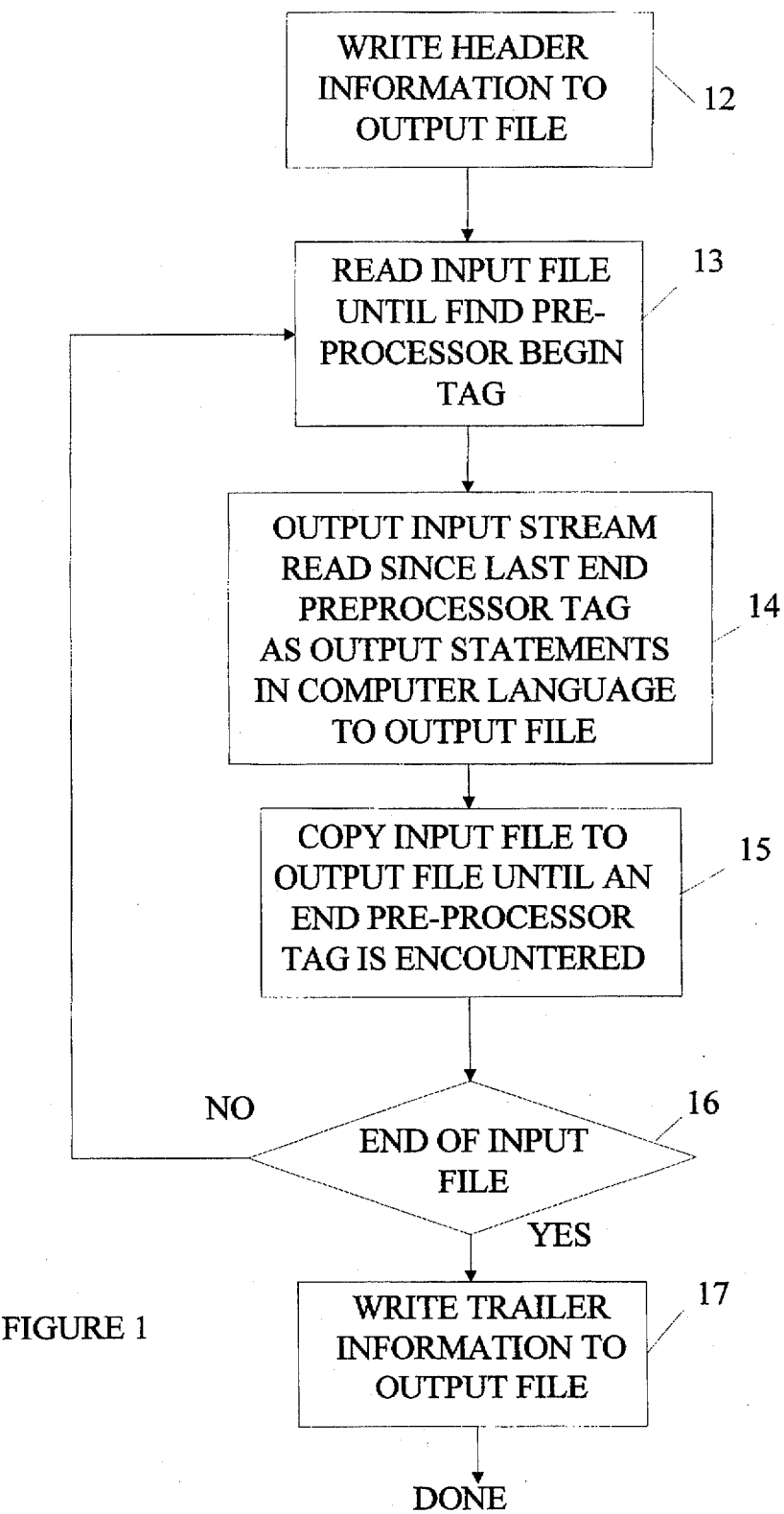
FIG. 1 is a flow chart for a preprocessor according to the present invention.

The present invention may be more easily understood with reference to the structure of a typical prior art hypertext document. Such a document consists of a string of characters in which specific sequences of characters are tagged. For the purposes of this discussion, the tagged sequences can be viewed as consisting of two types, those related to on-screen formatting of the document and those related to defining links to other documents. The first type includes tags that mark the beginning and end of sequences to be displayed in a particular style which defines font, print size, etc. Since such formatting is only indirectly related to the present invention, it will not be discussed in detail here.

The second type defines the links to other files. These sequences are defined by placing predefined tags at the beginning and end of each sequence, and specifying the file to sent in response to a user selecting the sequence with the user's pointing device. As these tags are also well known in the computer arts, they will not be discussed further here.

A hypertext document according to the present invention may be viewed as a standard HTML file having a new class of tags. These new tags mark the beginning and end of code sequences in a conventional computer language such as COBOL. The modified document is then used as input to a pre-processor for the computer language compiler in question. The pre-processor converts all conventional hypertext material to output statements in the language in question. This conversion converts the hypertext to the underlying computer language. The converted file is then compiled in the conventional manner to generate an executable that is run on the server in response to a request for the hypertext file. This executable provides the MIME stream when the user requests the hypertext file.

The present invention utilizes pre-processing and compilation to avoid the need to parse the HTML file each time a request is made for the file. The alternative approach of reading the HTML file each time it is needed, interpreting the underlying computer language and replacing data variables places a significant computational load on the server.

The method of the present invention does not restrict either the HTML or computer language portion of the program. The computer language compiler processes the computer language statements, and the HTML browser processes the HTML statements.

The method of the present invention places no restrictions on the user's browser. The user's browser only needs to deal with standard HTML. There is no need to download a specific script language to the user's computer, and hence, the user's browser does not need to be customized for a specific scripting language.

To simplify the following discussion, the underlying computer language will be assumed to be COBOL; however, it will be apparent to those skilled in the art that the teachings of the present invention can be applied with a wide range of conventional computer languages.

In the preferred embodiment of the present invention, a COBOLTYPE tag is added to the HTML language tag set. This tag is optional, but if present, must be in the HTML stream, and must appear before any other HTML or COBOL tags. The COBOLTYPE tag identifies the MIME Content-Type of the output for this program. The full syntax for the COBOLTYPE tag is as follows:

<COBOLTYPE [CONTENT[-TYPE]=content-type]>

The CONTENT-TYPE parameter indicates the MIME type of the information to be output by the program in the correct format for a CGI Program. If this parameter is not specified, the content type will be "text/html". If the programmer wishes to prevent a content type being output (e.g., the program is not the first in a sequence of COBOL programs or the programmer has some special requirement) then the programmer can use the CONTENT-TYPE="" to ensure that no content type header is output.

The COBOL TAG may embedded anywhere in the HTML stream. The text following the <COBOL> tag is assumed to be COBOL source code until a </COBOL> tag is encountered. For convenience a comment tag <!--COBOL statements--> is also included to allow COBOL statements to be inserted.

In the preferred embodiment of the present invention, an <ITERATE> tag is also included. The <ITERATE> tag marks the beginning of an iteration over a table of variable values. The full syntax for the tag is <ITERATE [OVER] variableName>. The number of iterations is the number of the "Occurs" parameter specified for variableName. The iteration continues until a </ITERATE>. Tag is found.

In the preferred embodiment of the present invention, there is also a variable replacement tag having the form <%name%> or alternatively %%name%%. The variable called "name" is substituted for this tag wherever the tag is found. The replacement occurs everywhere in the document, outside the COBOL tagged portion. The replacement does not take place within COBOL procedural statements. If <%name%> occurs within an iteration block, the number of the current iteration will be used to determine which occurrence of the variable is to be used. If the program is running as a CGI Program, then the variable name refers to the name of the variable received in the HTTP GET or POST stream. If the program has been called by another program passing a parameter containing replacement variables, then the variable name refers to the variable received in the linkage section parameter as discussed below. While the variable replacement operation could be implemented with separate COBOL, sections without the need to define a new tag, the tags are preferred since they require much less coding by the programmer.

In the preferred embodiment of the present invention, there is also a language variable replacement tag having the form <$dataname$> or alternatively $$dataname$$. The language variable called "dataname" is substituted for this tag wherever the tag is found. The replacement occurs everywhere in the document, outside the COBOL tagged portion. The replacement does not take place within COBOL procedural statements. The variable called dataname must be declared as a language variable in the hypertext COBOL program. While the language variable replacement operation could be implemented with separate COBOL sections without the need to define a new tag, the tags are preferred since they require much less coding by the programmer.

As noted above, if the program is called by another program which passes the variables that are to be applied to the embedded COBOL program, these variables are accessed within the COBOL program in the same way as variables received from the HTTP GET or POST stream. The calling program (if any) may pass the following parameter:

7

```
01  HTMLMAP-Parameter
    03  VariableNameLen    pic 9(2) comp-5.    *> length of variable name
    03  VariableName.                          *> variable name
```

8

```
     05  PIC X OCCURS 1 TO 255 DEPENDING ON VariableNameLen.
         03  ValueLen         pic 9(4) comp-5.    *> length of data item
         03  MaxOccurs        pic 9(9) comp-5.    *> Maximum possible OCCURS (=1 if
                                                     variable is not a table)
         03  ActualOccurs     pic 9(9) comp-5.    *> Actual OCCURS (=1 if not a
                                                     table)
         03  Stride           pic 9(9) comp-5.    *> Number of bytes in each table
                                                     item
         03  ValuePtr         pointer.            *> Pointer to actual data area
```

The above discussion can be more easily understood with reference to a simple COBOL-hypertext program. The program adds information to a database and displays the added information to the user. The hybrid file created by the programmer is as follows:

```
<COBOL>
select F1 assign "register.dat"
    organization is indexed
    access mode is dynamic
    record key is fEmail
    alternate key is fOrganization.

file section.
fd   f1.
01   f1-Rec.
     03   fName          pic x(60).
     03   fEmail         pic x(60).
     03   fOrganization  pic x(60).
     03   fAddress       pic x(250).
     03   fPhone         pic x(20).
     03   fFax           pic x(20).
     03   fWhen          pic x(8).
     03   fIP            pic x(15).
     03   fHost          pic x(30).
```

9

```
        working-storage section.
        01  DateTime.
            03  UnformattedDate.
                05  UYear       pic 9(4).
                05  UMonth      pic 9(2).
                05  UDay        pic 9(2).

03  FormattedDate.
                05  ODayOfMonth pic z9.
                05              pic x.
                05  OMonthWord  pic x(3).
                05              pic x.
                05  OFullYear   pic 9(4).

03  MonthNames      pic x(36) value
                "JanFebMarAprMayJunJulAugSepOctNovDec".
            03  redefines MonthNames.
                05  MonthName   pic x(3) occurs 12.

</COBOL>
<HTML>
<HEAD>
<TITLE>Registration Database: Information Gathered</TITLE>

<!
-- set up date info, this is an SGML comment
--
--COBOL
move function current-date to UnformattedDate
move UYear to OFullYear
--Now deal with the month
    (you can have 2 hyphens at neither, either or both ends of this line,
                                                parser is forgiving)
--COBOL move MonthName(UMonth) to OMonthWord
        move UDay to ODayOfMonth --
```

10

```
       -- all done --
       >

5     <BODY>
       <H1>Registration <!--HTML Comment, just for fun-->Confirmation</h1>
       Received on $$FormattedDate$$ from %%HTTP_USER_AGENT%%
       acting for %%REMOTE_HOST%% (%%REMOTE_ADDR%%)
       <hr>
10
       <!--COBOL getValue "Name" fName
       getValue "Email" fEmail
15     getValue "Organization" fOrganization
       getValue "Address" fAddress
       getValue "Phone" fPhone
       getValue "Fax" fFax
       -->
20     <COBOL> getValue "REMOTE_HOST" fIP </COBOL>
       <COBOL> getValue "REMOTE_ADDR" fHost
       move UnformattedDate to fWhen open i-o F1
25
       write F1-Rec </COBOL>

The following information has been filed:

30     <table>
       <tr>
       <td>Name<td><b>%%Name%%</b>
       <td>Email<td><b>%%Email%%</b>
       <tr>
35     <td>Organization<td><b>%%Organization%%</b>
       <tr>
```

```
<td>Phone<td><b>%%Phone%%</b>
<td>Fax<td><b>%%Fax%%</b>
<tr>
<td>Address<td><b>%%Address%%</b>

</table>
```

This hybrid source file is converted by the COBOL pre-processor to a file that may be viewed as having a header/trailer which provides the interface to the MIME stream on the server and a COBOL section in which the material within the COBOL tags is reproduced and the material within the hypertext sections is converted to COBOL display statements. The header section is as follows:

```
$set sourceformat(free) mfoo odoslide
*>-----------------------------------------------------------
*> LiveCOBOL support file. *** DO NO AMEND ***
*>
*> These declarations go at the start of the program
*>
*>
program-id. "ShowVariable" is external.
linkage section.
01  lcFieldName    pic x(255).
procedure division using lcFieldName delimited
invoked as == ShowValue <lcFieldName> ==.
end program "ShowVariable".

program-id. "ShowOccurence" is external.
linkage section.
01  lcFieldName    pic x(255).
01  lcIterator     pic 9(9) comp-5.
procedure division using lcFieldName delimited lcIterator
invoked as == ShowOccurence <lcFieldName> <lcIterator> ==.
end program "ShowOccurence".
```

12

```
program-id. "Show" is external.
linkage section.
01  lcFieldName    pic x(255).
01  ReturnChar     pic x.
procedure division using lcFieldName delimited
                returning ReturnChar
invoked as function == Show ( <lcFieldName> ) ==.
end program "Show".

program-id. "GetLength" is external.
linkage section.
01  lcFieldName    pic x(255).
01  lcLength       pic 9(9) comp-5.
procedure division using lcFieldName delimited lcLength
invoked as == GetLength <lcFieldName> <lcLength> ==.
end program "GetLength".

program-id. "GetValue" is external.
linkage section.
01  lcFieldName    pic x(255).
01  lcBuffer       pic x(500).
procedure division using lcFieldName delimited lcBuffer
invoked as == GetValue <lcFieldName> <lcBuffer> ==.
end program "GetValue".

program-id. "GetOccurence" is external.
linkage section.
01  lcFieldName    pic x(255).
01  lcIterator     pic 9(9) comp-5.
01  lcBuffer       pic x(500).
procedure division using lcFieldName delimited lcIterator lcBuffer
invoked as == GetOccurence <lcFieldName> <lcIterator> <lcBuffer> ==.
end program "GetOccurence".

program-id. "GetOccursCount" is external.
```

```
           linkage section.
           01  lcFieldName    pic x(255).
           01  lcIterator     pic 9(9) comp-5.
           procedure division using lcFieldName delimited lcIterator
 5         invoked as == GetOccursCount <lcFieldName> <lcIterator> ==.
           end program "GetOccursCount".

program-id. "SayValue" is external.
           linkage section.
10         01  lcBuffer        pic x(65535).
           procedure division using lcBuffer delimited
           invoked as == DISPLAYZ <lcBuffer> == .
           end program "SayValue".

15         program-id. "ShowValue" is external.
           linkage section.
           01  lcBuffer        pic x(65535).
           01  ReturnChar      pic x.
           procedure division using lcBuffer delimited
20                      returning ReturnChar
           invoked as function == Z ( <lcBuffer> ) == .
           end program "ShowValue".
           *>-------------------------------------------------------
```

The actual input file is then converted to the following file:

```
            id division.
            program-id. registernow.
    select F1 assign "register.dat"
30      organization is indexed
        access mode is dynamic
        record key is fEmail
        alternate key is fOrganization.

35
```

14

```
       file section.
       fd   f1.
       01   f1-Rec.
            03   fName           pic x(60).
 5          03   fEmail          pic x(60).
            03   fOrganization   pic x(60).
            03   fAddress        pic x(250).
            03   fPhone          pic x(20).
            03   fFax            pic x(20).
10          03   fWhen           pic x(8).
            03   fIP             pic x(15).
            03   fHost           pic x(30).

working-storage section.
15              *>---------------------------------------------------------------
                *> LiveCOBOL support file. *** DO NO AMEND ***
                *>
                *> These declarations go in WORKING-STORAGE SECTION
                *>
20              *>
                78   CGI-INPUT-MODULE           value "acccgi.int".

01   xA7-func                   pic x comp-x.

25              01   xA7-parm                   pic x comp-x.

01   LiveCOBOLVariables.

*>   variableLen can be used to hold lengths
30                   03   variableLen           pic 9(9) comp-5.

*>   iterator holds the current iteration number.
                     03   iterator              pic 9(9) comp-5.

35                   *>   occursCount holds the number of iterations
                     03   occursCount           pic 9(9) comp-5.
```

15

```
         *>  buffer can be used to hold alphanumeric data
         03  buffer              pic x(500).

01  WorkingVariables.
             *>  HTMLMap-Base points to the base of the HTMLMAP structure
             03  HTMLMap-Base        pointer.

*>  Temporary length
             03  lcTempLength        pic 9(9) comp-5.
             *>  Temporary pointer
             03  lcTempPointer       pointer.

03  NameLength          pic 9(9) comp-5.
             03  CGIIndex            pic 9(9) comp-5.
             03  CGIIndex2           pic 9(9) comp-5.
             03  ValueStart          pic 9(9) comp-5.
             03  ValueLength         pic 9(9) comp-5.
             03  ValueCount          pic 9(9) comp-5.
             03  LiveMode            pic 9(2) comp-5.
                 88  Standalone      value 0.
                 88  HTMLMapMode     value 1.
             03  VariableMode        pic 9(2) comp-5.
                 88  VarHTMLMap      value 0.
                 88  VarEnvironment  value 1.

*>  Space for the HTMLMap data.
         *>  Note that the size of this must be large enough for all the
         *>  variables that will be contained in the HTMLMap.
         *>  See ONIONS4.IF for details of the HTMLMap-Parameter.
         01  HTMLMap             pic x(1024).
         01  CGIChar redefines HTMLMap pic 9(2) comp-x occurs 1024.

*>-----------------------------------------------------------------
```

16

```
       01  DateTime.
           03  UnformattedDate.
               05  UYear      pic 9(4).
               05  UMonth     pic 9(2).
5              05  UDay       pic 9(2).

03  FormattedDate.
               05  ODayOfMonth  pic z9.
               05               pic x.
10             05  OMonthWord   pic x(3).
               05               pic x.
               05  OFullYear    pic 9(4).

03  MonthNames      pic x(36) value
15             "JanFebMarAprMayJunJulAugSepOctNovDec".
           03  redefines MonthNames.
               05  MonthName    pic x(3) occurs 12.

20         local-storage section.
           linkage section.
           *>-----------------------------------------------------------------
           *> LiveCOBOL support file. *** DO NO AMEND ***
           *>
25         *> These declarations will be placed in LINKAGE SECTION.
           *>
           *> Parameters used by the Vocabulary routines 01  lcFieldName      pic x(255).
30         01  lcLength         pic 9(9) comp-5.
           01  lcBuffer         pic x(65535).
           01  lcTempBuffer     pic x(65535).
           01  lcIterator       pic 9(9) comp-5.

35         *> The HTMLMap structure
           01  HTMLMAP-Parameter.
```

```
                         *>   length of the variable name
                         03   variableNameLen    pic 9(2) comp-x.
                         *>   n is the value of variableNameLen
                         03   variableName.
 5                           05         pic x(1) occurs 0 to 1
                                                 depending on variableNameLen.
                         *>   length of the data item
                         03   valueLen           pic 9(9) comp-x.
                         *>   maximum possible OCCURS (=1 if not a table)
10                       03   maxOccurs          pic 9(9) comp-x.
                         *>   actual OCCURS (=1 if not a table)
                         03   actualOccurs       pic 9(9) comp-x.
                         *>   number of bytes from start of one item to the next
                         03   stride             pic 9(9) comp-x.
15                       *>   pointer to the actual data area
                         03   valuePtr           pointer.

*>---------------------------------------------------------------
                   *>---------------------------------------------------------------
20                 *> LiveCOBOL support file. *** DO NO AMEND ***
                   *>
                   *> These declarations will be placed at the start procedure div.
                   *>
                   *>
25                     PROCEDURE DIVISION USING HTMLMap-Parameter.
                       set HTMLMap-Base to address of HTMLMap-Parameter
                       if HTMLMap-Base = null
                           set HTMLMap-Base to address of HTMLMap
                           set Standalone to true
30                     else
                           set HTMLMapMode to true
                       end-if if Standalone
35                         call CGI-INPUT-MODULE
                           call "CBL_ACCEPT_CGI" using HTMLMap
```

18

```
              move 18 to xA7-func
              move  1 to xA7-parm
              call x"A7" using xA7-func
                              xA7-parm
              end-call
         end-if
    *>----------------------------------------------------------------
         display "Content-type :" "text/html"
              & X"0d0a"
   display
        "<HTML>"
   display
        "<HEAD>"
   display
        "<TITLE>Registration Database: Information Gathered</TITLE>"
              display ' ' move function current-date to UnformattedDate
   move UYear to OFullYear move MonthName(UMonth) to OMonthWord
         move UDay to ODayOfMonth display ' '
   display
        "<BODY>"
   display
        "<H1>Registration "

display
        "Confirmation</h1>"
   display
```

19

```
            "Received on "
        FormattedDate
            " from "
              with no advancing
5           ShowValue "HTTP_USER_AGENT"
        display
            " "
        display
            "acting for "
10            with no advancing
              ShowValue "REMOTE_HOST"
        display
            " ("
              with no advancing
15            ShowValue "REMOTE_ADDR"
        display
            ")"
        display
            "<hr>"
20              display ' ' getValue "Name" fName
        getValue "Email" fEmail
25      getValue "Organization" fOrganization
        getValue "Address" fAddress
        getValue "Phone" fPhone
        getValue "Fax" fFax 30              getValue "REMOTE_HOST" fIP getValue "REMOTE_ADDR" fHost
        move UnformattedDate to fWhen 35      open i-o F1
```

20

```
      write F1-Rec display ' '
              display ' '
              display ' '
      display
          "The following information has been filed:"
              display ' '
      display
          "<table>"
      display
          "<tr>"
      display
          "<td>Name<td><b>"
            with no advancing
            ShowValue "Name"
      display
          "</b>"
      display
          "<td>Email<td><b>"
            with no advancing
            ShowValue "Email"
      display
          "</b>"
      display
          "<tr>"
      display
          "<td>Organization<td><b>"
            with no advancing
            ShowValue "Organization"
      display
          "</b>"
      display
          "<tr>"
      display
          "<td>Phone<td><b>"
```

```
            with no advancing
            ShowValue "Phone"
        display
            "</b>"
5       display
            "<td>Fax<td><b>"
            with no advancing
            ShowValue "Fax"
        display
10          "</b>"
        display
            "<tr>"
        display
            "<td>Address<td><b>"
15          with no advancing
            ShowValue "Address"
        display
            "</b>"
                display ' '
20      display
            "</table>"
            goback.
```

The trailer is as follows:

```
*>----------------------------------------------------------------
*> LiveCOBOL support file. *** DO NO AMEND ***
*>
*> These declarations will be placed at the end of the program
*>
*>
entry "GetLength" using lcFieldName lcLength.

move 0 to lcLength
    set VarEnvironment to true
```

22

```
    perform SetupName if Standalone
        perform FindCGI-Data
    else
        perform FindHTMLMap-Data
    end-if if varEnvironment
        display lcFieldName(1:NameLength) upon environment-name
        accept buffer from environment-value
        move length of buffer to ValueLength
        perform until ValueLength = 0 or buffer(ValueLength:1) not = space
            subtract 1 from ValueLength
        end-perform
    end-if move ValueLength to lcLength exit program.

entry "GetValue" using lcFieldName lcBuffer.

set VarEnvironment to true
    perform SetupName
    move x"00" to lcBuffer(1:1)

if Standalone
        perform FindCGI-Data
        if VarHTMLMap
            move HTMLMap(ValueStart:ValueLength) to
                            lcBuffer(1:ValueLength)
        end-if
    else
        perform FindHTMLMap-Data
        if VarHTMLMap
```

23

```
            move lcTempBuffer(1:ValueLength) to
                            lcBuffer(1:valueLength)
        end-if
    end-if if varEnvironment
        display lcFieldName(1:NameLength) upon environment-name
        accept Buffer from environment-value
        move length of buffer to ValueLength
        perform until ValueLength = 0 or buffer(ValueLength:1) not=space
            subtract 1 from ValueLength
        end-perform
        if ValueLength <> 0
            move buffer(1:ValueLength) to lcBuffer(1:ValueLength)
        end-if
    end-if if ValueLength <> 0
        move x"00" to lcBuffer(ValueLength + 1:1)
    end-if exit program.

entry "GetOccurence" using lcFieldName lcIterator lcBuffer.

set VarEnvironment to true
    perform SetupName
    move x"00" to lcBuffer(1:1)
    move lcIterator to ValueCount if Standalone
        perform FindCGI-Data
        if VarHTMLMap
            move 0 to ValueCount
            perform until exit
                if (CGIIndex > length of HTMLMap) or
```

24

```
              (HTMLMap(CGIIndex:1) = X"00")
                exit program
            end-if
            if  (CGIChar(CGIIndex) = NameLength) and
                                            *> Name Length Match
                (HTMLMap(CGIIndex + 1:NameLength) =
                                        lcFieldName(1:NameLength))
                                                 *> Name match
                add CGIChar(CGIIndex) to CGIIndex *> Skip over name
                add 1                 to CGIIndex
                add 1                 to ValueCount *> Value Count
                if ValueCount = lcIterator
                    move CGIChar(CGIIndex) to ValueLength
                                                  *> Value Size
                    add 1              to CGIIndex
                    move HTMLMap(CGIIndex:ValueLength)
                        to lcBuffer(1:ValueLength)
                    move x"00"         to lcBuffer(ValueLength + 1:1)
                    exit program
                end-if
            else
                add CGIChar(CGIIndex) to CGIIndex
                add 1 to CGIIndex
            end-if
            add CGIChar(CGIIndex) to CGIIndex *> Skip over value
            add 1                 to CGIIndex
        end-perform
    end-if
else
    perform FindHTMLMap-Data
    if VarHTMLMap
        if lcIterator <= actualOccurs
            set lcTempPointer to valuePtr
            compute lcTempLength = stride * (lcIterator - 1)
            set lcTempPointer up by lcTempLength
            set address of lcTempBuffer to lcTempPointer
```

```
                perform TrimSpaces
                move lcTempBuffer(1:ValueLength) to
                                             lcBuffer(1:ValueLength)
                move x"00" to lcBuffer(ValueLength + 1:1)
            end-if
        end-if
    end-if exit program.

entry "GetOccursCount" using lcFieldName lcIterator.

move 0 to lcIterator
    set VarEnvironment to true
    perform SetupName if Standalone
        perform FindCGI-Data
        if VarHTMLMap
            move 0 to lcIterator
            perform until exit
                if (CGIIndex > length of HTMLMap) or
                        (HTMLMap(CGIIndex:1) = X"00")
                    exit program
                end-if
                if (CGIChar(CGIIndex) = NameLength) and
                                            *> Name Length Match
                        (HTMLMap(CGIIndex + 1:NameLength) =
                                            lcFieldName(1:NameLength))
                                                    *> Name match
                    add 1                to lcIterator  *> Value Count
                end-if
                add CGIChar(CGIIndex) to CGIIndex *> Skip over name
                add 1                 to CGIIndex
                add CGIChar(CGIIndex) to CGIIndex *> Skip over value
                add 1                 to CGIIndex
```

26

```
            end-perform
        end-if
    else
        perform FindHTMLMap-Data
        if VarHTMLMap
            move actualOccurs to lcIterator
        end-if
    end-if exit program.

entry "ShowOccurence" using lcFieldName lcIterator.
    GetOccurence lcFieldName lcIterator buffer
    displayz buffer
    exit program
        .

entry "SayValue" using lcBuffer.
entry "ShowValue" using lcBuffer.
    perform varying ValueLength from 1 by 1 until
        (ValueLength > 128) or
        (lcBuffer(ValueLength:1) = X"00")
    end-perform
    subtract 1 from ValueLength
    display lcBuffer(1:ValueLength) with no advancing
    exit program returning 8224.

entry "ShowVariable" using lcFieldName.
entry "Show" using lcFieldName.
    *>GetValue lcFieldName buffer set VarEnvironment to true
    perform SetupName
    move x"00" to buffer(1:1)

if Standalone
```

27

```
            perform FindCGI-Data
            if VarHTMLMap
                move HTMLMap(ValueStart:ValueLength) to buffer
            end-if
5           else
                perform FindHTMLMap-Data
                if VarHTMLMap
                    move lcTempBuffer(1:ValueLength) to buffer(1:ValueLength)
                end-if
10          end-if if varEnvironment
                display lcFieldName(1:NameLength) upon environment-name
                accept buffer from environment-value
15              move length of buffer to ValueLength
                perform until ValueLength = 0 or buffer(ValueLength:1) not=space
                    subtract 1 from ValueLength
                end-perform
            end-if
20
            if ValueLength <> 0
                move x"00" to buffer(ValueLength + 1:1)
                display buffer(1:ValueLength) with no advancing
            end-if
25
            exit program returning 8224.

*> given lcFieldName, return the length of the fieldname in NameLength

30      SetupName.
            perform varying NameLength from 1 by 1 until
                (NameLength > length of lcFieldName) or
                (lcFieldName(NameLength:1) = X"00")
            end-perform
35          subtract 1 from NameLength
            call "CBL_TOUPPER" using lcFieldName
```

28

```
                         by value NameLength
           end-call.

*> given lcFieldName and NameLength (length of fieldname)
    *> locates the correct slot in HTMLMAP-Parameter FindCGI-Data.

move 1 to CGIIndex
        perform until exit
            if (CGIIndex > length of HTMLMap) OR
                    (HTMLMap(CGIIndex:1) = X"00")
                move 0 to ValueLength
                exit perform
            end-if
            if  (CGIChar(CGIIndex) = NameLength) AND  *> Name Length Match
                (HTMLMap(CGIIndex + 1:NameLength) = lcFieldName(1:NameLength))
                                                      *> Name match
                move CGIIndex to CGIIndex2
                add CGIChar(CGIIndex2)  to CGIIndex2 *> Skip over name
                add 1                   to CGIIndex2
                move CGIChar(CGIIndex2) to ValueLength    *> Value Size
                add 1                   to CGIIndex2
                move CGIIndex2 to ValueStart
            *>  add ValueLength to CGIIndex
                set VarHTMLMap to true
                exit perform
            else
                add CGIChar(CGIIndex)   to CGIIndex *> Skip over name
                add 1                   to CGIIndex
                add CGIChar(CGIIndex)   to CGIIndex *> Skip over value
                add 1                   to CGIIndex
            end-if
        end-perform
```

29

```
*> given lcFieldName and NameLength (length of fieldname)
*> locates the correct slot in HTMLMAP-Parameter FindHTMLMap-Data.
    set address of HTMLMap-Parameter to HTMLMap-Base
    set lcTempPointer to HTMLMap-Base move 0 to ValueLength
    perform until variableNameLen = 0
        if variableNameLen = NameLength     *> Length match
            if variableName(1:NameLength) = lcFieldName(1:NameLength)
                set address of lcTempBuffer to valuePtr
                perform TrimSpaces
                set VarHTMLMap to true
                exit perform
            end-if
        end-if
        compute lcTempLength = 20 + variableNameLen + 1
        set lcTempPointer up by lcTempLength
        set address of HTMLMap-Parameter to lcTempPointer
    end-perform TrimSpaces.
    move valueLen to ValueLength
    perform until ValueLength = 0
        if lcTempBuffer(ValueLength:1) not = space
            exit perform
        else
            subtract 1 from ValueLength
        end-if
    end-perform

*>-----------------------------------------------------------------
``` end program registernow.

While the above description of the present invention has been in terms of HTML and COBOL, it will be apparent to those skilled in the art that that the teachings of the present invention may be applied to any word processing format and computer language. The word processing file format is modified by defining a beginning and ending tag for the computer language segment.

The pre-processor for the computer language creates a source code file for the compiler in which output statements (e.g. in a COBOL implementation, DISPLAY statements are used) that, when executed, reproduce everything that is not enclosed by the language tags are inserted for the word processing file material. The code between the tags is copied to the source file. The executable file generated by the source code when compiled with the appropriate compiler or interpreter will then generate a word processing file in the word-processing format when executed.

Refer now to FIG. 1 which is a flow chart for a preprocessor according to the present invention. The pre-processor starts by writing any header information needed by the compiler or the operating system interface to the output file as shown at 12. This information may include the code needed to access particular input variables such as described above with respect to the HTML example.

The pre-processor then reads the input file until it finds a pre-processor tag that begins a computer language segment as shown at 13. The material from the input file that has been read prior to encountering the starting language tag is written to the output file as display statements in the computer language as shown at 14. The actual output sequence is a matter of design choice. For example, each line can be written as a single display statement as the line is read from the input file if the line does not contain a tag. Alternatively, the entire input stream from the input file since the last end tag can be stored and processed as a bloc in a single display statement. For the purposes of this discussion, a display statement is defined as any statement which will reproduce the material when executed in the resulting computer program.

The material from the beginning pre-processor tag to the ending pre-processor tag is then transferred to the output file as shown at 15. Any desired code translation can also be accomplished here. For example, the display tags described above with reference to the HTML embodiments of the present invention are expanded in terms of source language statements as part of this process.

When the end tag corresponding to the beginning pre-processor tag is encountered, the program checks for additional input. If the end of the input file is encountered, any trailers needed by the compiler and interface code are added to the output file as shown at 17. If there is more material in the input file, the program resumes reading the input file at block 13.

It should be noted that the pre-processor does not have to "understand" the word processor file formats. The pre-processor only needs to recognize the computer language tags. Any tag format can be used provided the word processing file format, or the embedded document, does not contain a tag of this form. Similarly, the word processing software does not have to "understand" the computer language tags; hence, no modifications to the word processing software are required. Finally, the computer language compiler also does not need to be modified.

In general, additional tags can be added to the definition. The replacement tags defined above are examples of such tags. Again, only the preprocessor needs to understand these tags. In addition, some form of interface tag that defines the inputs and output, i.e., a file, console, particular data stream, etc., will in general be useful.

It should also be noted that the present invention provides a means for defining a "live" document that may be easily transported between platforms. The source code provided by the pre-processor may be used on any platform that provides a compiler for that source code.

While the above described embodiments have referred to compiled computer languages, it will be apparent to those skilled in the art that the teachings of the present invention can be applied to interpreted languages such as BASIC and REXX.

The above described embodiments of the present invention have referred to a system in which the compiled computer language file resides on the server and is executed when a request for the "document" is received. However, it will be apparent to those skilled in the art from the above discussion that the source file may be stored instead. In such a system, the source file would be compiled the first time a request for the document is received. The operating system on the server can detect the need to re-compile the file by checking the time stamps on the source file and the executable file currently stored on the server. If the source file has been altered since the last compilation, the operating system causes the source file to be re-compiled prior to invoking the executable file.

Various modifications to the present invention will become apparent to those skilled in the art from the foregoing description and accompanying drawings. Accordingly, the present invention is to be limited solely by the scope of the following claims.

What is claimed is:

1. A method for operating a computer to convert a word processing file, which comprises a linear sequence of characters, said linear sequence of characters comprising segments of said linear sequence marked by beginning and ending tags, into a source file comprising computer language statements, said source file defining a computer program that will generate an output stream in a format recognizable by a word processing program adapted to read said output stream, said method comprising the steps of:

reading a linear sequence of characters from said word processing file;

translating a segment of said linear sequence of characters that is not surrounded by said beginning and ending tags to computer language output statements and outputting said computer language output statements to said source file, wherein said output statements cause a computer program generated from said source file, when said generated computer program is executed, to reproduce said linear sequence of characters in an output stream generated by said computer program; and providing computer source language statements in said source file corresponding to a segment of said linear sequence of characters that is surrounded by said beginning and ending tags.

2. The method of claim 1 wherein said word processing file comprises HTML.

3. The method of claim 1 wherein said computer language is COBOL.

4. The method of claim 1 wherein said tags occur in pairs, one marking the beginning of a sequence of characters and one marking the end of a sequence of characters, and wherein said pairs of tags are of first and second types, said first pair of tags marking sequences of characters that are to be copied to said source file without alteration, and said pair of tags marking sequences of characters that are to be translated to predetermined source code statements determined by an indication associated with said second pair of tags.

5. The method of claim 1 further comprising the step of providing computer source code statements in said source file enabling a program generated from said source file to receive input from a source outside of said generated computer program.

6. The method of claim 1 further comprising the step of replacing predetermined syntax in said linear sequence of characters that is not surrounded by said tags with variables defined outside of said linear sequence of characters.

* * * * *